US008866845B2

(12) United States Patent
Leung et al.

(10) Patent No.: US 8,866,845 B2
(45) Date of Patent: Oct. 21, 2014

(54) ROBUST OBJECT RECOGNITION BY DYNAMIC MODELING IN AUGMENTED REALITY

(75) Inventors: Henry Leung, Alberta (CA); Siyue Chen, Alberta (CA)

(73) Assignee: Empire Technology Development LLC, Wilmington, DE (US)

( * ) Notice: Subject to any disclaimer, the term of this patent is extended or adjusted under 35 U.S.C. 154(b) by 1082 days.

(21) Appl. No.: 12/720,858

(22) Filed: Mar. 10, 2010

(65) Prior Publication Data

US 2011/0221769 A1    Sep. 15, 2011

(51) Int. Cl.
  *G09G 5/00*    (2006.01)
  *G06K 9/68*    (2006.01)
  *G06K 9/46*    (2006.01)

(52) U.S. Cl.
  CPC ................... *G06K 9/6892* (2013.01); *G06K 9/469* (2013.01)
  USPC ...................................................... 345/633

(58) Field of Classification Search
  CPC ... G06T 7/0028; G06T 7/0034; G06T 7/0046; G06T 7/0081; G06K 9/4671; G06K 9/6211; G06K 9/00288; G06K 9/00885
  USPC ....................................................... 345/633
  See application file for complete search history.

(56) References Cited

U.S. PATENT DOCUMENTS

| 5,333,069 | A | 7/1994 | Spence |
| 5,974,168 | A | 10/1999 | Rushmeier et al. |
| 6,047,078 | A | 4/2000 | Kang |
| 6,356,659 | B1 | 3/2002 | Wiskott et al. |
| 7,187,809 | B2 | 3/2007 | Zhao et al. |
| 7,480,414 | B2 | 1/2009 | Brown et al. |
| 7,623,731 | B2 | 11/2009 | Lim et al. |
| 2003/0059116 | A1 | 3/2003 | Kupeev et al. |
| 2004/0131232 | A1 | 7/2004 | Meisner et al. |
| 2005/0151743 | A1* | 7/2005 | Sitrick ........................ 345/473 |
| 2006/0290695 | A1 | 12/2006 | Salomie |
| 2007/0273644 | A1 | 11/2007 | Mondine |
| 2009/0002489 | A1 | 1/2009 | Yang |
| 2009/0067668 | A1* | 3/2009 | Beresford et al. ............ 382/100 |
| 2009/0110236 | A1 | 4/2009 | Huang et al. |
| 2011/0221769 | A1 | 9/2011 | Leung et al. |

FOREIGN PATENT DOCUMENTS

| CN | 101080762 A | 11/2007 |
| JP | 10-049542 A | 2/1998 |
| JP | 2000200298 | 7/2000 |
| JP | 2003-281297 A | 3/2003 |

(Continued)

OTHER PUBLICATIONS

Object Recognition as Many-to-Many Feature Matching by M. Fatih Demirci and Ali Shokoufandeh International Journal of Computer Vision 69(2), (pp. 203-222) (May 2006).*

(Continued)

*Primary Examiner* — Kee M Tung
*Assistant Examiner* — Haixia Du
(74) *Attorney, Agent, or Firm* — Turk IP Law, LLC

(57) ABSTRACT

Technologies are generally described for providing a robust object recognition scheme based on dynamic modeling. Correlations in fine scale temporal structure of cellular regions may be employed to group the regions together into higher-order entities. The entities represent a rich structure and may be used to code high level objects. Object recognition may be formatted as elastic graph matching.

29 Claims, 9 Drawing Sheets

(56) References Cited

FOREIGN PATENT DOCUMENTS

| KR | 1020050039426 A | 4/2005 |
|---|---|---|
| WO | WO2009124151 A2 | 7/2009 |
| WO | WO2009082700 A1 | 10/2009 |
| WO | 2010029553 A1 | 3/2010 |
| WO | WO 2010/029553 | 3/2010 |

OTHER PUBLICATIONS

Graphical models for graph matching: Approximate models and optimal algorithms by Terry Caelli Pattern Recognition Letters 26, (pp. 339-346) (Feb. 2005).*

Randomized Trees for Real-Time Keypoint Recognition by Vincent Lepetit Comput. Vision Lab., Ecole Polytech. Fed. de Lausanne, Switzerland; (pp. 1-7) (Jul. 2005).*

Probabilistic Graph Matching by Canonical Decomposition by H. Yaghi, H. Krim, Image Processing, ICIP . 15th IEEE International Conference (p. 2368-2372) (Oct. 2008).*

Nayar et al., Dimensionality of Illumination in Appearance Matching, IEEE International Conference on Robotics and Automation (ICRA), vol. 2, pp. 1326-1332, Apr. 1996.

Leonardis et al., Dealing With Occlusions in the Eigenspace Approach, Computer Vision and Pattern Recognition, IEEE Computer Society Conference on, pp. 453, 1996 IEEE Computer Society Conference on Computer Vision and Pattern Recognition (CVPR'96), Jun. 1996.

Lu, Matching 2.5D Face Scans to 3D Models; IEEE Transaction on Pattern Analysis and Machine Intelligence, vol. 28, No. 1, Jan. 2006.

Gremban, Appearance-Based Vision and the Automatic Generation of Object Recognition Programs; Three-Dimensional Object Recognition Systems AK Jain and P.J. Flynn (Editors) 0 1993 Elsevier Science Publishers B.V. All rights reserved, Jul. 1993.

Mittrapiyanuruk et al., Calculating the 3D-Pose of Rigid Objects Using Active Appearance Models, in Proceedings of the Int. Conference in Robotics and Automation, May 2004.

Selinger et al., A Perceptual Grouping Hierarchy for Appearance-Based 3D Object Recognition Department of Computer Science, University of Rochester, (selinger, nelson) @cs.rochester.edu, 1-20, 1999.

Mittrapiyanuruk, Tracking Three-Dimensional Rigid Objects with Direct Image Alignment and Local Appearance Based Feature Matching, Purdue University, 2008, 126 pages; AAT 3330547.

Hadjidemetriou et al., Appearance Matching with Partial Data, Department of Computer Science, Columbia University, This work was supported in part by ONR/DARPA MURI program under ONR Contract No. N00014-95-1-060, 1998.

Torresani et al., Feature Correspondence via Graph Matching: Models and Global Optimization, Microsoft Research Ltd., Cambridge, UK, {ltorre, carrot}@microsoft.com and University College London, UK, vnk@adastral.ucl.ac.uk, 2008.

Ulrich et al., Appearance-Based Place Recognition for Topological Localization, IEEE International Conference on Robotics and Automation, San Francisco, CA, Apr. 2000, pp. 1023-1029. Best Vision Paper Award.

PCT/US11/26252 International Search Report and Written Opinion mailed Nov. 28, 2011.

First KR Office Action dated Oct. 21, 2013.

* cited by examiner

COMPUTER PROGRAM PRODUCT 700

SIGNAL-BEARING MEDIUM 702

704 AT LEAST ONE OF

ONE OR MORE INSTRUCTIONS FOR ESTABLISHING LINKS BETWEEN NODES;
    ONE OR MORE INSTRUCTIONS FOR DEFINING ATTRIBUTED GRAPHS;
    ONE OR MORE INSTRUCTIONS FOR MATCHING ATTRIBUTED GRAPHS BETWEEN IMAGE AND MODEL DOMAINS;
    ONE OR MORE INSTRUCTIONS FOR DETERMINING MAPPED CONNECTIONS.

| COMPUTER-READABLE MEDIUM 706 | RECORDABLE MEDIUM 708 | COMMUNICATIONS MEDIUM 710 |
|---|---|---|

FIG. 7

ROBUST OBJECT RECOGNITION BY DYNAMIC MODELING IN AUGMENTED REALITY

BACKGROUND

Unless otherwise indicated herein, the materials described in this section are not prior art to the claims in this application and are not admitted to be prior art by inclusion in this section.

Augmented reality (AR) refers to a view of a physical (real) world environment whose elements are augmented by virtual, typically computer-generated, imagery, thereby creating a mixed reality. The augmentation may be conventionally in real time and in context with environmental elements, such a sporting event, a military exercise, a game, etc. AR technology enables the information about surrounding real world of a person to become interactive and digitally usable by adding object recognition and image generation. Artificial information about the environment and the objects may be stored and retrieved as an information layer separate from a real world view layer.

The present disclosure appreciates that there are several limitations with AR systems. Object recognition is a major component of AR, and appearance-based approaches are commonly used in object recognition. Appearance-based object recognition approaches can handle combined effects of shape, reflectance properties, pose in the scene, illumination conditions, and comparable effects. In addition, appearance-based representations may be acquired through an automatic learning phase unlike traditional shape representations. However, various challenges remain with the appearance-based recognition technique, since it rests on direct appearance-based matching and cannot successfully process occlusions, outliers, and varying backgrounds. In other words, the appearance-based approach is not robust, where the term robustness refers to the results remaining stable in the presence of various types of noise and can tolerate a certain portion of outliers.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
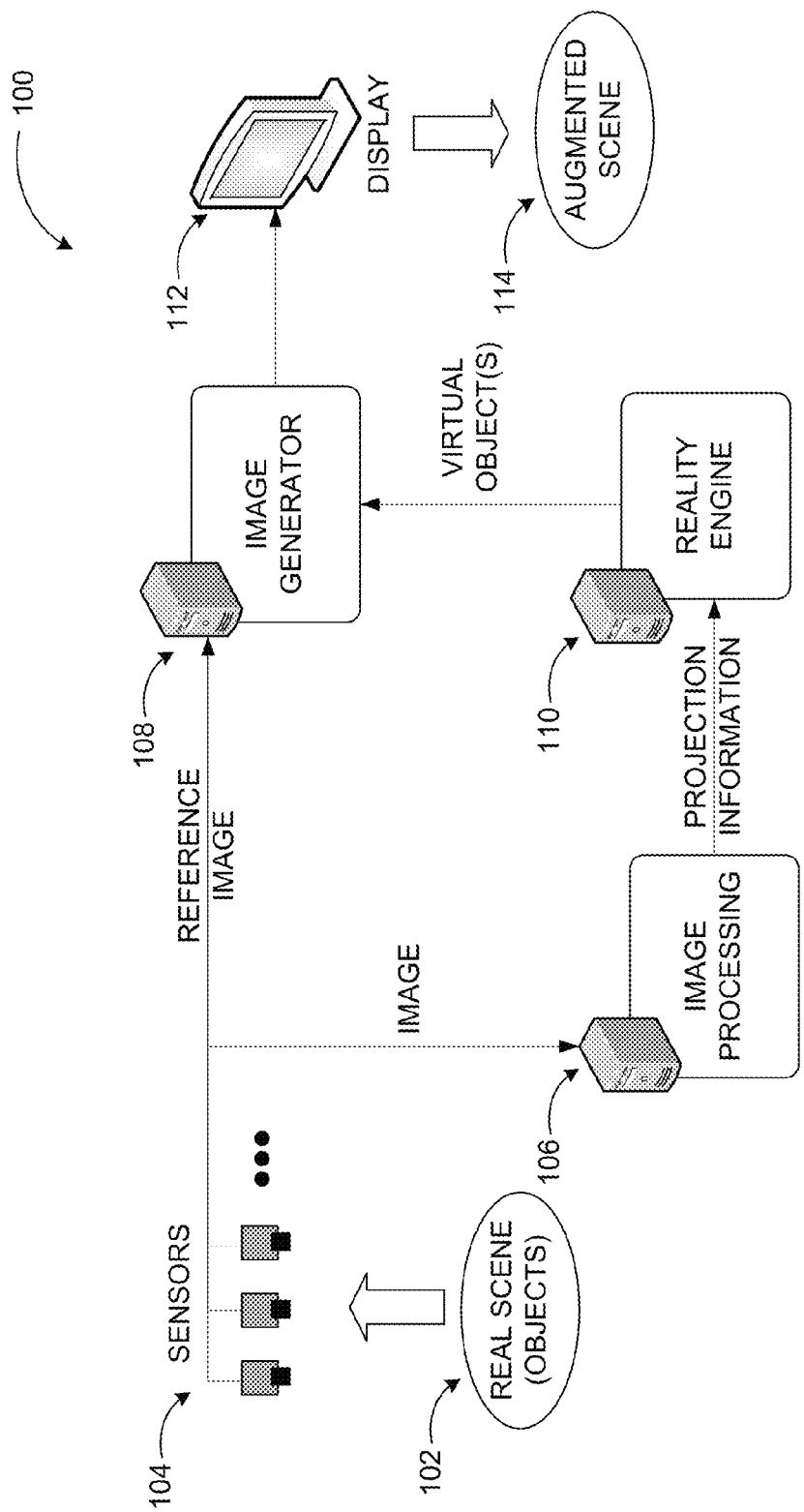
FIG. 1 illustrates an example Augmented Reality (AR) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to robust object recognition in AR systems based on dynamic modeling and graph matching.

Briefly stated, a robust object recognition scheme based on dynamic modeling employs correlations in fine scale temporal structure of cellular regions to group these regions together into higher-order entities. The entities represent a rich structure and may be used to code high level objects. Object recognition may be formatted as elastic graph matching.

FIG. 1 illustrates an example Augmented Reality (AR) system 100, where some embodiments may be implemented in accordance with the present disclosure. AR explores the application of computer-generated imagery in live video streams to expand the real world presentation. AR systems commonly include controlled environments containing a number of sensors and actuators, one or more computing device to process real and computer-generated imagery, and visualization systems such as head-mounted displays, virtual retinal displays, monitor or similar regular displays, and comparable devices.

AR system 100 includes sensors 104 configured to capture live images of real scene (objects) 102. Sensors 104 may be digital cameras, webcams, and/or similar image capturing devices that may provide either analog or digital images as captured images. The captured image(s) may be provided by the sensors 104 to an image processing sub-system 106, which may be adapted to perform digitization of analog images into digital images, receive digital images, and/or process digital images. Processing provided by image processing sub-system 106 may include determining locations of feature points in the images, computation of affine projections, tracking of edges, filtering, and/or similar operations. Image processing sub-system 106 may also be configured to provide projection information such as results of the above described operations to reality engine 110. Reality engine 110 may be adapted to execute a graphics process to render scenes based on the captured images. Virtual objects may be rendered by reality engine 110, which may be arranged to employ dynamic modeling and graph matching as discussed in more detail below.

Image generator 108 may be adapted to receive reference image(s) from sensors 104, receive virtual object(s) from reality engine 110, and overlay the captured real scene images with the virtual object(s) to generate an augmented scene. In one example implementation, the merging of the virtual and real scene images may be performed through luminance keying, where the virtual image is the key input and the real scene image is the reference input. In that implementation, the real scene image may provide a background signal for the luminance key and also serve as a synchronization signal for the keyer (image generator). Display 112 is one example visualization mechanism that can be used to generate an augmented scene for viewing by a user. As discussed previously, other types of display devices may be used to provide visualization of the augmented scene 114 for a user.

Image processing sub-system 106, reality engine 110, and image generator 108 may be implemented as separate applications, an integrated application, a centralized service, or a distributed service on one more computing devices. The one or more computing devices may be either heterogeneous or homogeneous, and may be implemented as a general purpose computing devices or a special purpose computing devices that may be comprised as a standalone computer, a networked computer system, a general purpose processing unit (e.g., a micro-processor, a micro-controller, a digital signal processor or DSP, etc.), or a special purpose processing unit. If executed on different computing devices, various components of the AR system 100 may be configured to communicate with one another over one or more networks.

The network(s) may comprise any topology of servers, clients, switches, routers, modems, Internet service providers, and any appropriate communication media (e.g., wired or wireless communications). A system according to embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network such (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

Figure 2:
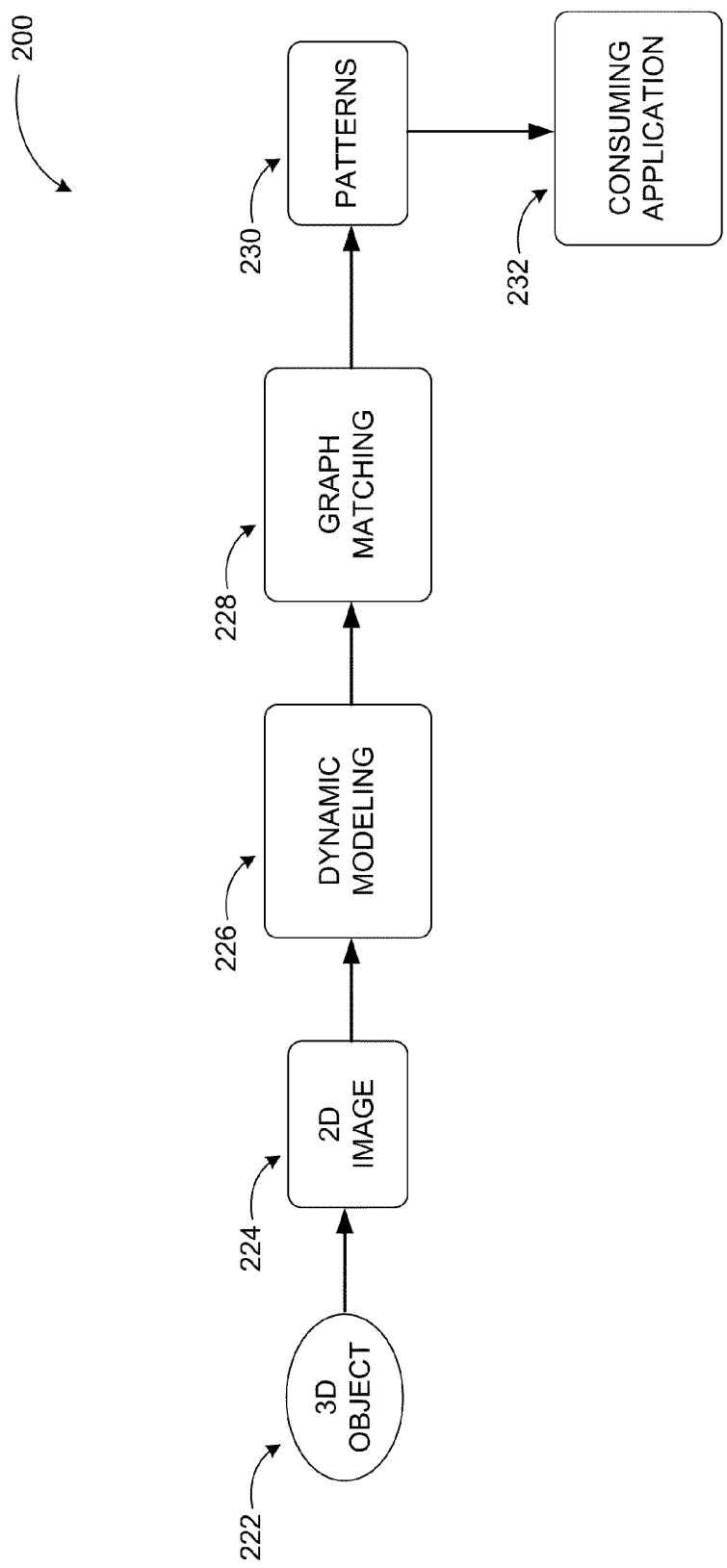
FIG. 2 illustrates a block diagram of an example AR system employing dynamic modeling and graph matching.

FIG. 2 illustrates block diagram 200 of an example AR system employing dynamic modeling and graph matching in accordance with at least some embodiments described herein. Object recognition is, for example, widely used in the machine vision industry for purposes of inspection, registration, and manipulation, among other things. However, conventional systems for object recognition depend commonly on correlation-based template matching. The present disclosure identifies and appreciates that while these conventional systems may be effective for certain engineered environments where object pose and illumination are tightly controlled, template matching may become computationally burdensome when object rotation, scale, illumination, and three dimensional pose are allowed to vary, and even more so when dealing with partial visibility and large model databases.

A dynamic modeling based system according to at least some embodiments of the present disclosure may take advantage of a data format based on syntactically linked structures. More precisely, images may be represented in the image domain as attributed graphs. Thus, the image domain contains a two dimensional array of nodes. Each node at a particular position may include a number of different features. Example feature types may include one or more of local light intensities, reflectance properties, pose in the scene, occlusions, and/or background variations. However, more complex feature types that can be derived through a filtering operation may also be used. The relationships between the nodes in the image domain may be referred to as excitatory connections. An excitatory connection between two nodes is a weighted connection, where the weight may be positive (i.e. causing a system excitation or positive signal in the system). In some example implementations, the neighboring nodes may be connected. In other implementations, complex connections between any number of nodes may exist. According to the dynamic model, a particular object may be represented by a sub-graph of the image domain that can be affected by the object.

The model domain can be a collection of attributed graphs (i.e. idealized copies of sub-graphs) in the image domain. Thus, excitatory connections can exist between the image domain and the model domain. These excitatory connections can preserve some features. For example, if two nodes exist, one in the image domain and one in the model domain, they may have a connection between them when they belong to the corresponding feature types. With such a structure, object recognition may be realized as a process of graph matching: an attributed graph in the model domain encoding an object may be locally distorted to reflect the deformations and changes in perspective.

In an example graph matching, two graphs may be considered approximately identical when there exists an approximate neighborhood preserving and feature type preserving mapping between multiple nodes at the image domain and at the model domain. Graph matching may be implemented according to some embodiments by grouping and selectively activating the nodes in the sub-graph of the image domain. This may be achieved in part without reference to the model domain, simply by binding nodes with similar feature vectors together. As a result, nodes within the parts of the image corresponding to one object tend to synchronize their activity, while nodes between different image segments tend to de-synchronize and break their dynamic links. Next, the nodes and links in the sub-graph may be identified and activated at the model domain (i.e. a connection pattern retrieved from an associative memory for connection patterns). Following the identification and activation of links in the model domain, the connections between nodes with similar features in the image domain and in the model domain (many-to-many) may be reduced to a consistent (i.e. topology-preserving) one-to-one mapping. It should be noted that the above described operations do not need to be carried out sequentially. Indeed, a system according to embodiments may perform these actions in an interlaced fashion since each operation may need partial results of the others.

Returning to FIG. 2, block diagram 200 shows a two dimensional (2D) image 224 of a three dimensional (3D) object 222 that may be provided to a dynamic modeling block 226 of an AR system according to at least one of the described embodiments. Dynamic modeling block 226 may be adapted to perform image domain transformation(s) such as filtering, vertex and edge attributes may be determined, and an attributed image domain graph (with vertex and edge labels) may be provided to graph matching block 228. Graph matching block 228 may be adapted to identify and activate links between nodes of the sub-graphs, identify and activate the links in the model domain, and reduce the connections to a one-to-one mapping, as discussed previously. The resulting patterns 230 may be provided to any consuming application 232, such as a rendering engine.

Figure 3A:
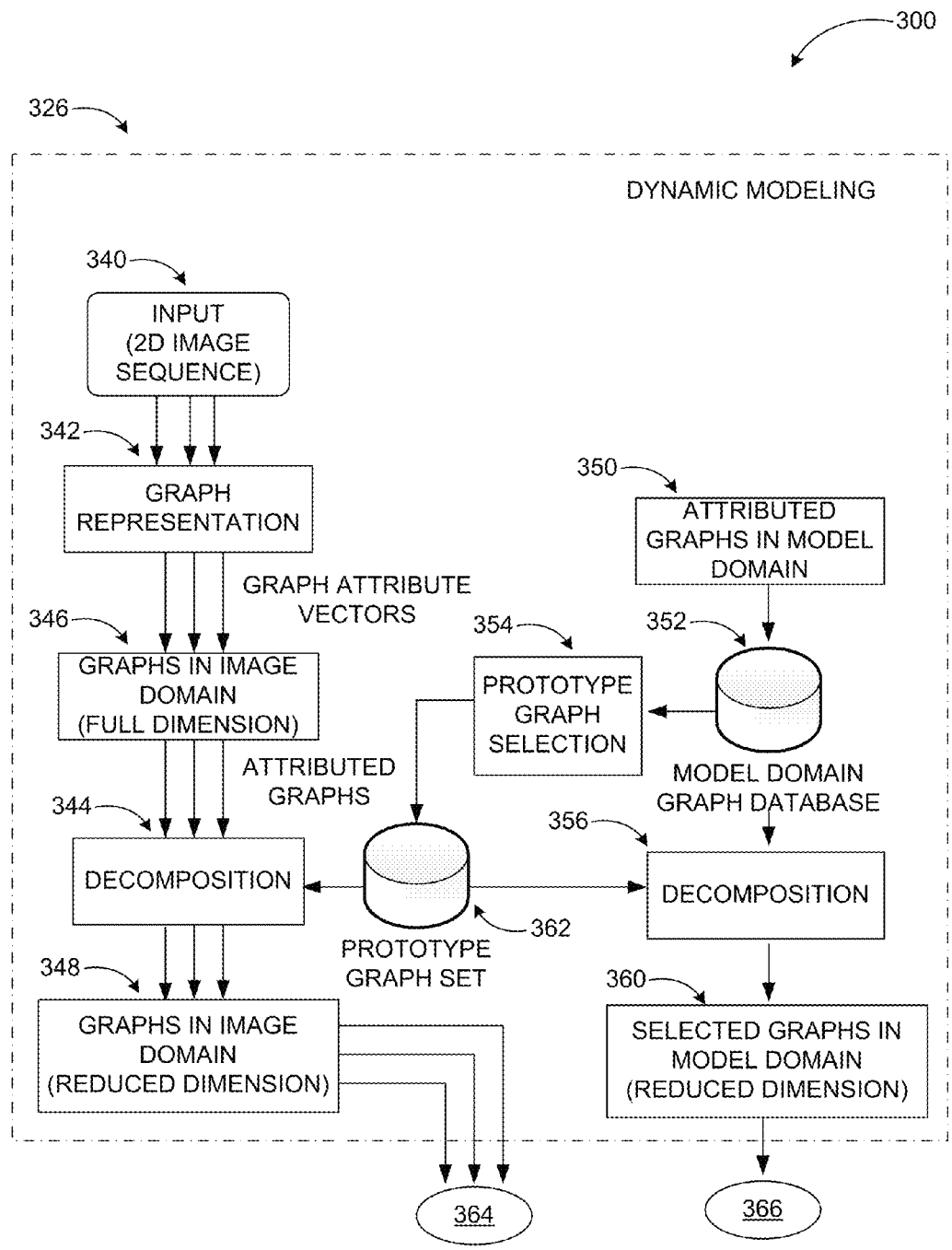
FIG. 3A illustrates a block diagram of example processes in an example dynamic modeling sub-system.

FIG. 3A illustrates block diagram 300 of example processes in an example dynamic modeling sub-system 326, arranged in accordance with at least some embodiments described herein. A dynamic modeling based object recognition system according some embodiments may include processes executed in two sub-systems: dynamic modeling subsystem and graph matching sub-system. As shown in diagram 300, image representation may be accomplished in dynamic modeling sub-system 326 by applying a dynamic structure to modeling 2-D gray scale digital images, and extracting graph models (364, 366) as a result. Using the extracted graph models 364 and 366, a graph matching algorithm may be applied to input graphs to search for the matching graphs from a database in order to assign class label(s) as discussed in more detail below in conjunction with FIG. 3B.

Dynamic modeling sub-system 326 may be implemented as hardware, software, or a combination of hardware and software. For example, a generic purpose or specialized video processor may be configured to perform the operations described below. An example dynamic modeling sub-system 326 is adapted to receive a 2D image sequence as input 340. A goal of object recognition using dynamic models according to embodiments is to find a data format for encoding information on attributes and links of graphs in image domain and to transfer the information to the model domain. Pre-processing the images may involve estimating actual attribute values of each neuron in image domain. This may be accomplished by time averaging from a set of fluctuating images (e.g., a sequence of images from a video) with respect to each neuron. Bindings between neurons may be encoded in the form of temporal correlation, which plays the role of synaptic weights for signal transmission.

As a first step, the sequence of digital images 340 (e.g., captured from a video) or stationary images may be processed to generate graph representation (i.e. graph attribute vectors) at box 342. An example process of graph extraction and representation is illustrated below in conjunction with FIG. 4. As a result of the pre-processing and graph extraction, graphs in image domain 346 are obtained. These are referred to as full dimension graphs, since a reduction in dimension structure is to follow. Similarly, attributed graphs may be defined and set up in model domain at box 350 resulting in the model domain graph database 352. When an image is formed in the image domain, the local feature detectors centered at one of its points may be bundled to form a composite feature detector. A composite feature detector may be provided to the model domain to be compared as a whole to other composite feature detectors, thereby establishing attributed model domain graphs. The use of composite feature detectors may reduce computational and memory burden on the AR system by decreasing the need to train new individual features as detectors for complex features before new object classes can be recognized.

The graphs in model domain may act as a prototype graph database, with which the graph matching algorithm can be implemented. A prototype graph selection process 354 (as described in FIG. 3C) may yield prototype graph set 362, which may be used in decomposition of graphs in the image and model domains (344, 356). The model domain graph database 352 is also an assemblage of attributed graphs, idealized copies of sub-graphs in image domain. After establishing a prototype sub-graphs set 362, the extracted graphs in image domain may be reduced (344) into graphs according to predefined rules. The reduced dimension graphs in image domain 348 may be composed of a combination of subsets from the prototype graphs. Similarly, the graphs in model domain (from model domain graph database 352) may also be decomposed (356) into a combination of subsets from the prototype graphs resulting in graphs with reduced dimension in structure in image and model domains (348, 360 respectively).

The links that represent neighborhood relationships within the image domain and within the model domain may then be set up as discussed below in conjunction with FIG. 3B. Neural objects thereby acquire internal structure, and their relationships can now be constrained to combinations with matched syntactical structure forming the basis for object recognition.

Figure 3B:
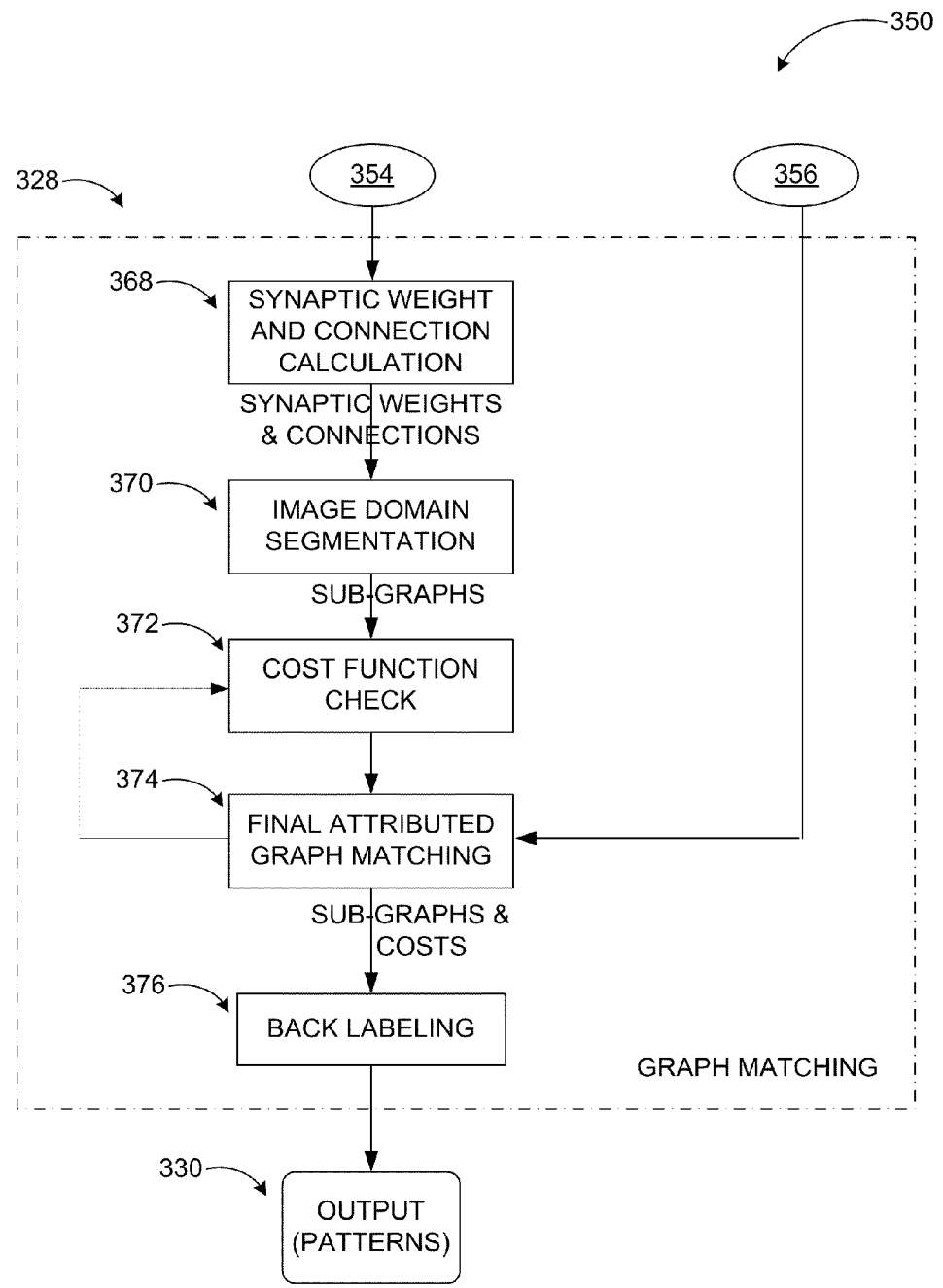
FIG. 3B illustrates a diagram of operations within an example graph matching sub-system.

FIG. 3B is an illustrative diagram of operations 350 within an example graph matching sub-system 328 that is arranged in accordance with at least some embodiments described herein. Graph matching sub-system 328 may be embodied by the same device (and/or software) as dynamic modeling sub-system 326 of FIG. 3A or by a different device (and/or software).

Operations 350 may include one or more of blocks 368, 370, 372, 374, 376 and/or 330. At block 368, "SYNAPTIC WEIGHT AND CONNECTIONS CALCULATION", a graph matching algorithm implemented in a computing device may be adapted to pre-process attributed image domain graphs (connection indicated by reference numeral 364). The pre-processing may involve estimating actual attribute values of each neuron in image domain, which may be done by time-averaging from a set of fluctuating images with respect to each neuron. Binding between neurons may be encoded in a form of temporal correlation, which may be utilized as synaptic weights for signal transmission.

Block 368 may be followed by block 370. At block 370, "IMAGE DOMAIN SEGMENTATION", the nodes in the sub-graph I of the image domain may be grouped. The grouping or segmentation may be achieved by binding nodes with similar feature vectors together, such nodes being likely to exist within the same object. In this manner, nodes within parts of the image or scene corresponding to one object tend to synchronize their activity, while nodes between different image segments tend to de-synchronize and break their dynamic links.

Block 370 may be followed by block 372. At block 372, "COST FUNCTION CHECK", a cost function check may be performed as part of graph matching based on the graph attributes provided from the dynamic modeling sub-system. A cost function is a measure of how far away a particular solution is from an optimal solution for a given problem. In this case, the optimization involves the matching of vertex labels and edge labels.

Block 372 may be followed by block 374. At block 374, "FINAL ATTRIBUTED GRAPH MATCHING", attributed graph matching may be applied for object recognition. Attributed graph matching can be based on finding and selectively activating a sub-graph composed of part (sub-graph) I of the image domain that is identical or approximately identical to a stored model graph M, if the stored model graph M exists (connection indicated by reference numeral 366). The one-to-one connections between corresponding points in I and M may also be determined as part of attributed graph matching. In particular, the process may be implemented by a search for a set of vertex positions, which simultaneously optimizes the matching of vertex labels and edge labels according to an established cost function as described above. The many-to-many connections between nodes with similar features in I and M may also be pared down to a consistent one-to-one mapping during the operation described in block 374.

Block 374 may be followed by block 376. At block 376, "BACK LABELING", the image may be back labeled with recognized patterns. The graph matching process may include events with simultaneous activation of a block of neighboring neurons in I and a block of neighboring neurons in M with corresponding positions. As a consequence, the dynamic binding between matched graphs may be used to back label the image with the patterns being recognized and to form representations of composite objects and scenes based on the patterns. The patterns may be an output 330 of the graph matching sub-system 328 performing operations 350.

Figure 3C:
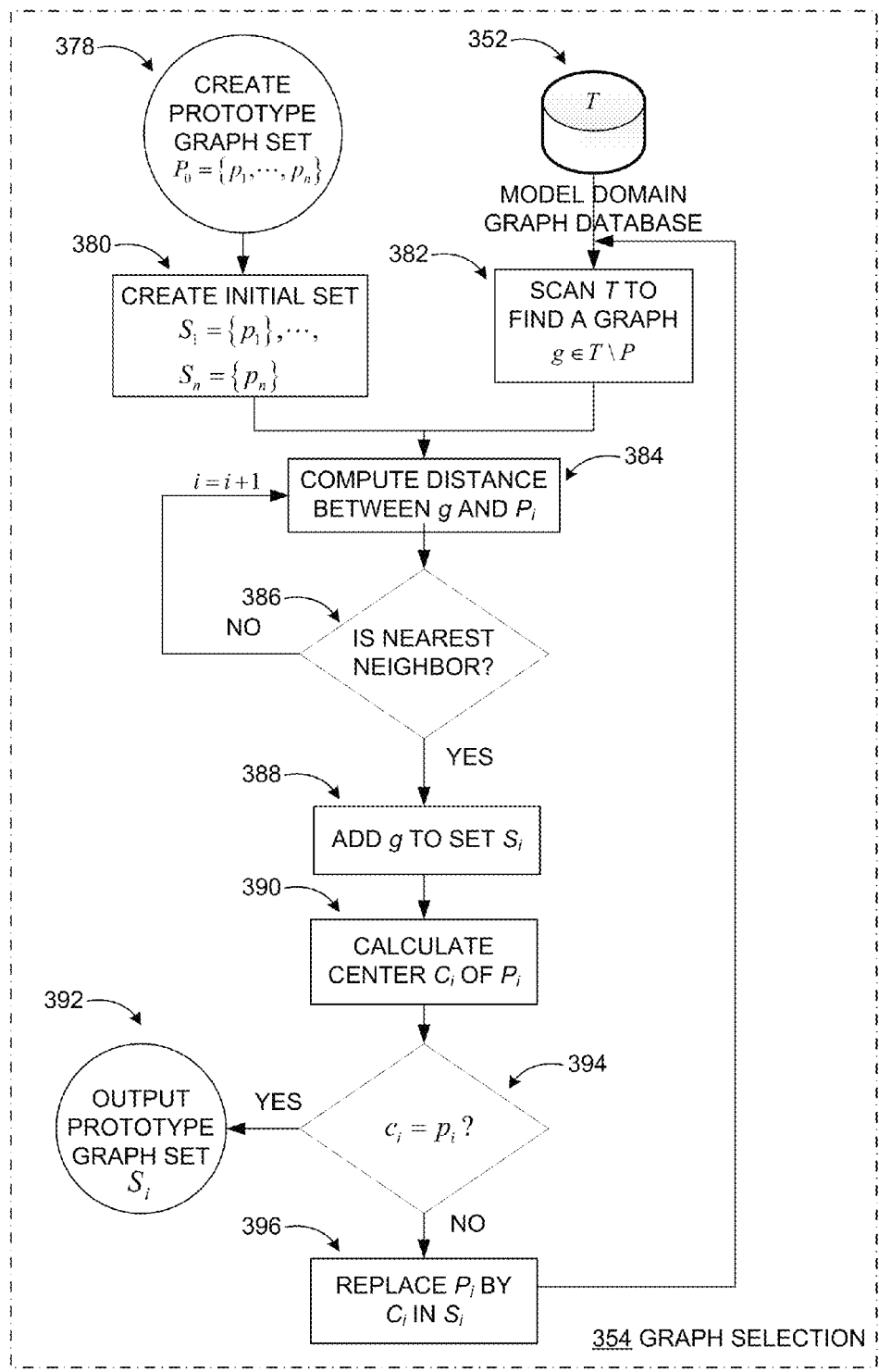
FIG. 3C illustrates a diagram of operations within an example graph selection sub-system.

FIG. 3C illustrates a diagram of operations within an example graph selection sub-system arranged in accordance with at least some embodiments described herein. The operations described in FIG. 3C may be performed in prototype graph selection box 354 of the dynamic modeling sub-system in FIG. 3A.

A major challenge in performing graph matching in real-time lies in the high complexity of graph models. The complexity may be caused by the graphs' complex structure and the intrinsic high dimensionality of graphs. According to some of the embodiments, an automated method for constructing a lower dimensional vector representation (a subset of all graph representation) may be employed by developing an effective graph selection method.

The process may begin with input block 378, "CREATE PROTOTYPE GRAPH SET", an initial set of n prototype graphs $P_0 = \{p_1, \ldots, p_n\}$ may be constructed, for example by selecting the graphs randomly. The initial set may include simpler structural graphs and may be used to span a more complete graph models in both image domain and model domain. Prototype graphs sets may be constructed from a training graph set in model domain using a variety of prototype graph selection algorithms. Then, the extracted graphs from input images domain and the training graph in model domain may be decomposed into subsets of graphs with respect to each domain, which are simpler in structure while keeping the most informative information of the original ones for recognition.

Specifically, the goal of prototype graph selection may be to choose a subset of graphs from the training set in model domain (e.g. from model domain graph database 352) that represent the different classes precisely with respect to their graph structure. The prototype graph may be small enough to span a more complicated graph structure in both image domain and model domain. The prototype graphs may simultaneously avoid redundancies in terms of selection of similar graphs and carry sufficient information.

At block 380, "CREATE INITIAL SET", an n sets $S_i$ may be selected such that each set includes one prototype $S_1 = \{p_1\}, \ldots, s_n = \{p_n\}$. At block 382, "SCAN T TO FIND A GRAPH", training graph set(s) from the model domain may be scanned to find a graph $g \in T \backslash P$. For each graph g, its nearest neighbor, $p_i \in P$, may be found and the graph under consideration added to the set $S_i$ corresponding to prototype $p_i$ as shown by blocks 384 "COMPUTE DISTANCE BETWEEN g AND $P_i$", 386 "IS NEAREST NEIGHBOR?", and 388 "ADD g TO SET $S_i$". These steps may result in n disjointed sets with $T \cup_{1 \leq i \leq n} S_i$.

At block 390, "CALCULATE CENTER $c_i$ OF $P_i$", a center $c_i$ may be found for each set $S_i$. $c_i$ may be a graph, for which a maximum distance to other objects in $S_i$ is minimum. For each center $c_i$, where $c_i = p_i$, an output prototype graph set $S_i$ may be provided as shown be decision block 394 "$c_i = p_i$?" and output block 392 "OUTPUT PROTOTYPE GRAPH SET $S_i$". For each center $c_i$, where $c_i \neq p_i$, $p_i$ may be replaced by $c_i$ in $S_i$ as shown in block 396 "REPLACE $p_i$ BY $c_i$ IN $S_i$" and the process returned to block 382 for obtaining another training set. The process may end when no more changes in the sets $S_i$ occur. The prototype graphs may be provided by the centers of the n disjointed sets.

While embodiments have been discussed above using specific examples, components, and configurations, they are intended to provide a general guideline to be used for robust object recognition through dynamic modeling in AR systems. These examples do not constitute a limitation on the embodiments, which may be implemented using other components, modules, and configurations using the principles described herein. For example, any suitable cost function may be used in matching vertex and edge labels. Furthermore, actions discussed above may be performed in various orders, especially in an interlaced fashion.

Figure 4:
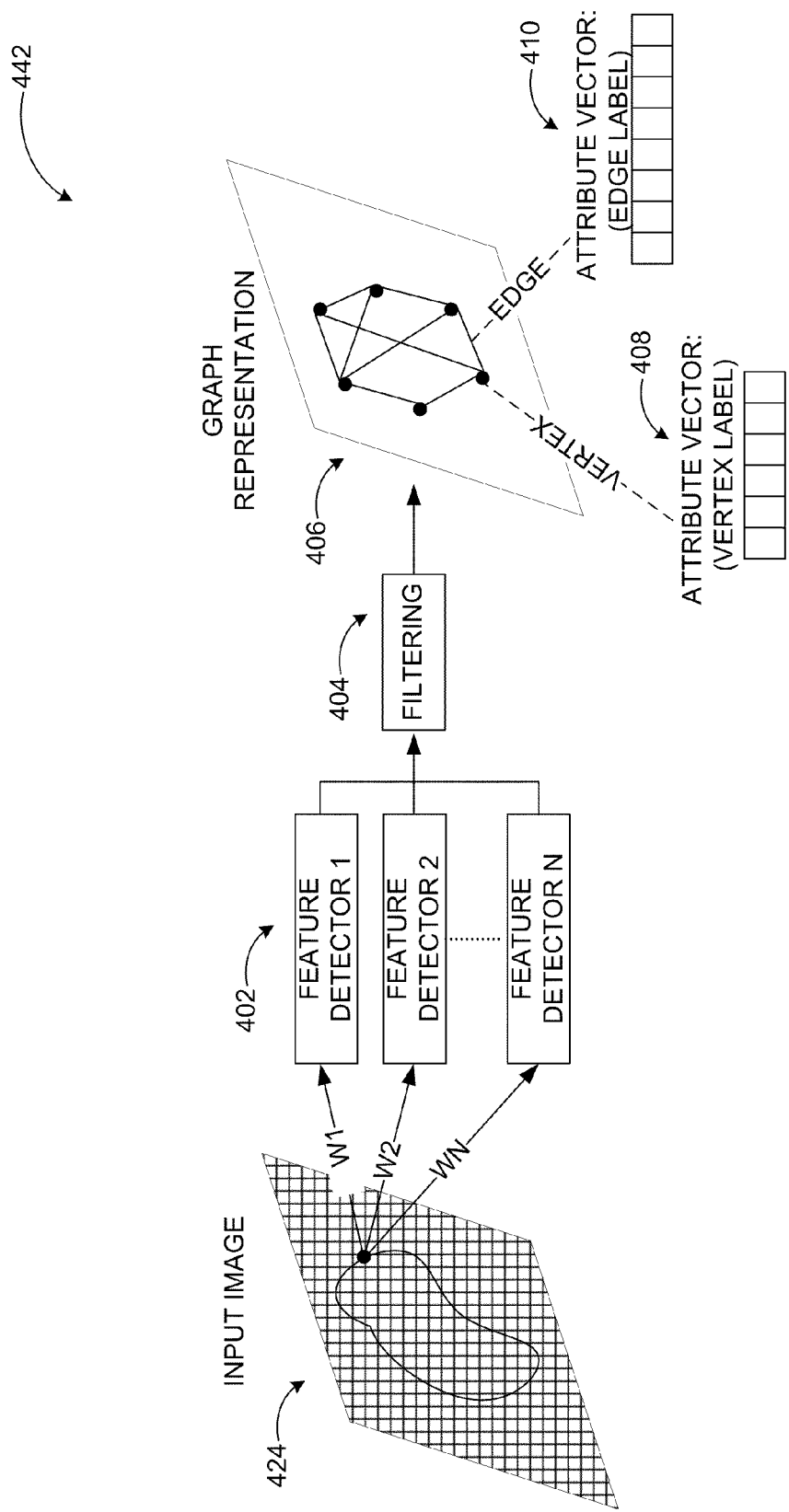
FIG. 4 illustrates how an input image may be represented as attributed graphs in a system employing dynamic modeling and graph matching.

FIG. 4 illustrates how an input image may be represented as attributed graphs in a system employing dynamic modeling and graph matching in accordance with at least some examples described herein. In image representation according to some embodiments, a dynamic structure may be applied to modeling 2-D digital images, and as a result the graph models extracted through the process illustrated in diagram 442. The dynamic structure may include graph representation in image domain and model domain. As a first step, features (W1-WN) may be extracted from input digital image in order to form a graph representation 406 using these features (i.e. image domain representation). The graph representation 406 in image domain may be a 2-D array of nodes, with each node including N different feature detector neurons 402. In one aspect, forming a graph representation 406 of input image 424 in image domain may be equivalent to selecting a set of feature detectors 402 and applying a filter 404 on pixels of the input image 424. The results may be so called vertex label 408, a feature vector that represents the activity of local feature detectors.

A second step may include forming links between each node. The result may be so called edge labels 410 of the graph representation 406, representing the connectivity between the vertices. Thus, an input image 424 may be converted into an attributed graph in the image domain with attributes (feature vectors) attached to both vertices and edges. An object may consequently be a sub-graph representation in image domain with similar attributes.

When an image is extracted to be a graph in the image domain, the local feature detectors centered at one of its points may correspond to being bundled to form a composite feature detector as shown in diagram 442. The composite feature detector may be provided to the model domain and compared to other composite feature detectors there. This may eliminate or reduce a necessity to train new individual features as detectors for complex features before new object classes can be recognized.

Figure 5:
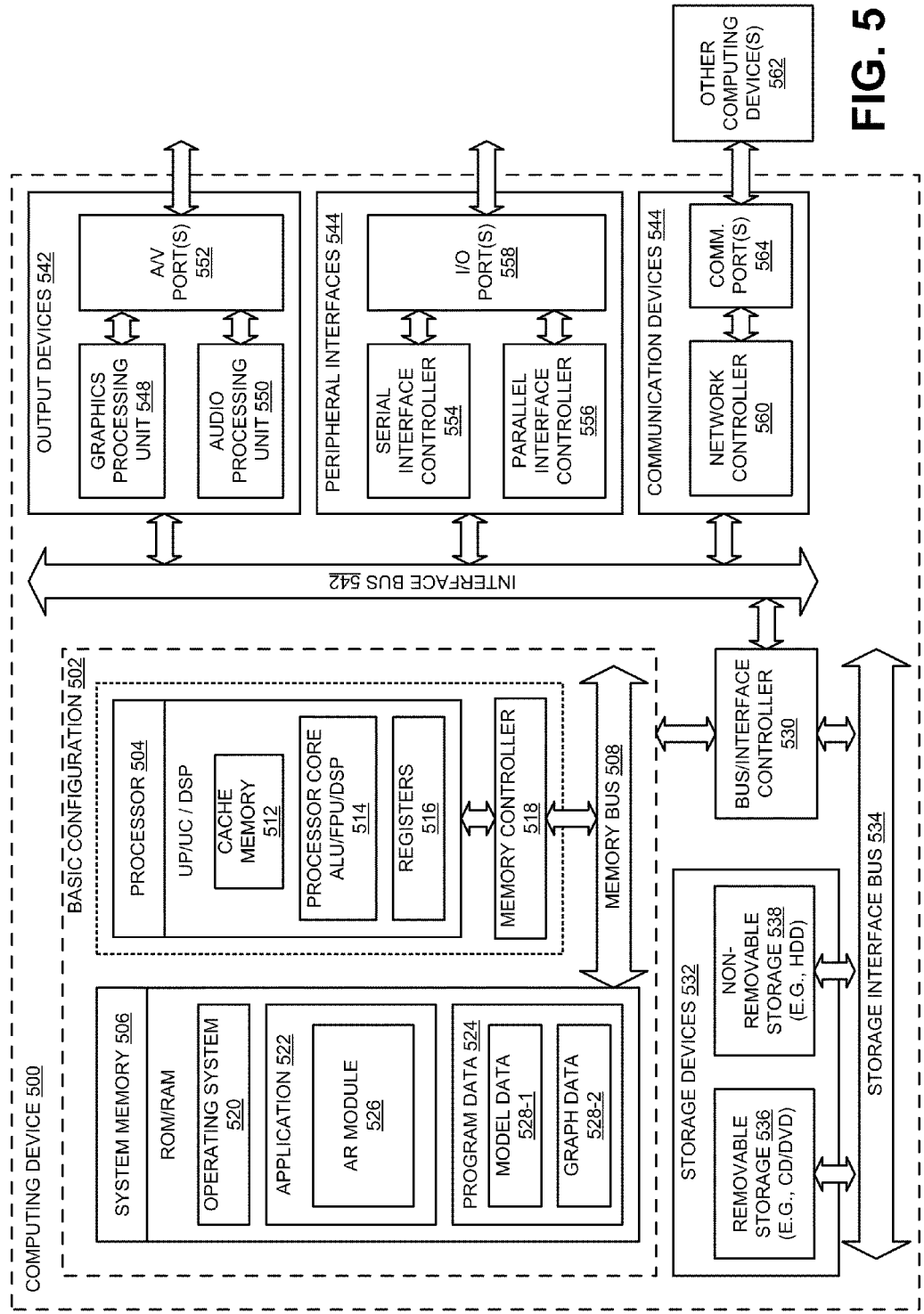
FIG. 5 illustrates a general purpose computing device, which may be used to implement dynamic modeling and graph matching in an AR system.

FIG. 5 illustrates an example general purpose computing device 500, which may be used to implement dynamic modeling and graph matching in an AR system according to present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an AR module 526 that is arranged to adjust operational parameters of an object recognition system using dynamic modeling and attributed graph matching as discussed above. Program data 524 may include one or more of imaging data, model data 528-1, graph data 528-2, and similar data as discussed above in conjunction with FIGS. 3A and 3B. This data may be useful in generating the one-to-one mapping between image domain sub-graphs and model domain sub-graphs as is described herein. In some embodiments, application 522 may be arranged to operate with program data 524 on operating system 520 such that three dimensional objects are recognized and virtual representations generated as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
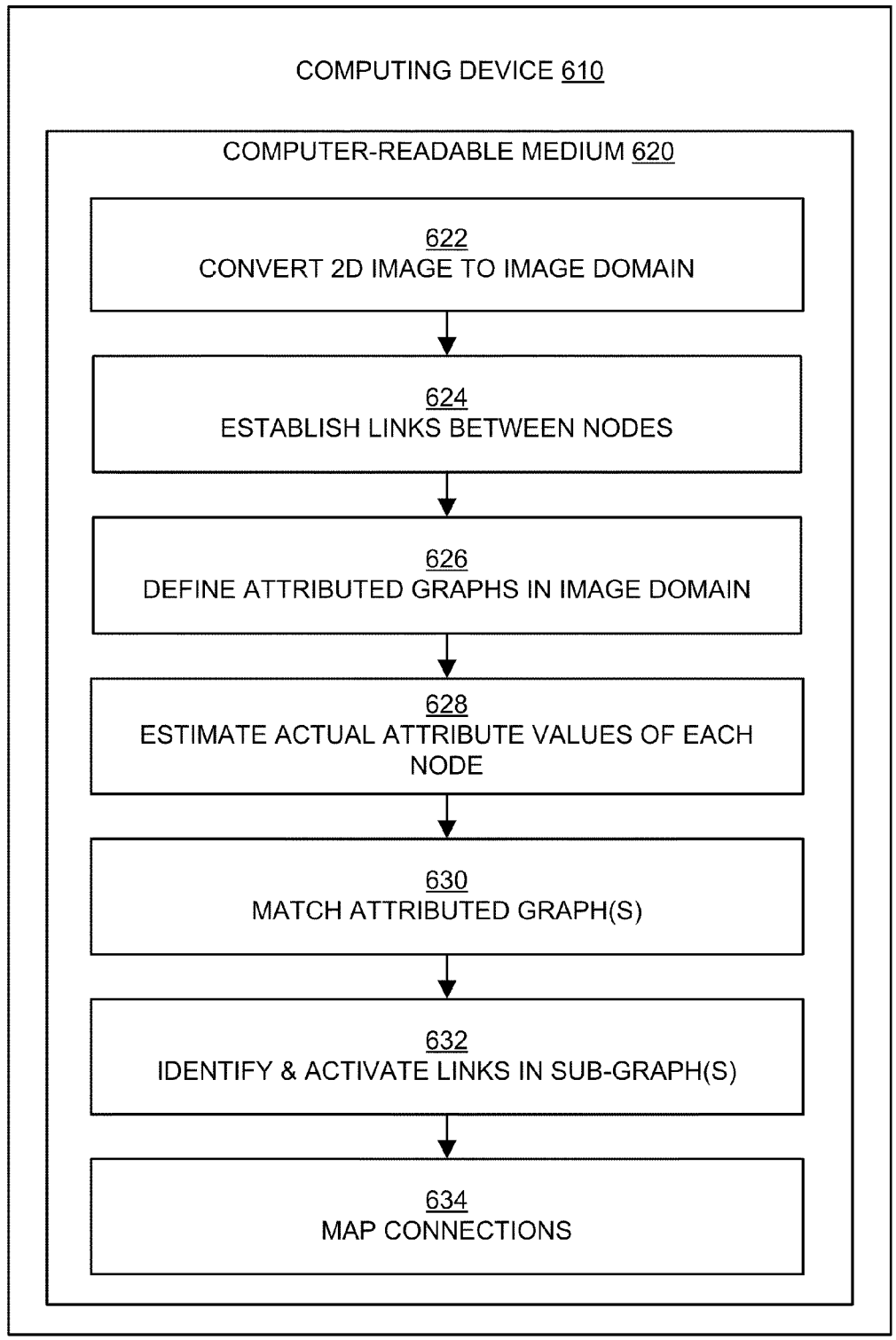
FIG. 6 is a flow diagram illustrating an example method that may be performed by a computing device such as device 500 in FIG. 5.

FIG. 6 is a flow diagram illustrating an example method that may be performed by a computing device such as device 500 in FIG. 7, arranged in accordance with at least some embodiments described herein. Example methods may include one or more operations, functions or actions as illustrated by one or more of blocks 622, 624, 626, 628, 630, 632, and/or 632. The operations described in blocks 622 through 634 may also be stored as computer-executable instructions in a computer-readable medium such as computer-readable medium 620 of computing device 610.

A process of employing dynamic modeling and graph matching in AR object recognition may begin with block 622, "CONVERT 2D IMAGE TO IMAGE DOMAIN". At block 622, a 2D image of a 3D object in the real scene may be obtained by a processor of a computing device (e.g. processor 504 or graphics processing unit 548 of computing device 500). Each node in the image domain may consist of a number of different feature detector neurons. A set of feature detectors may be selected and applied to each pixel of the 2D image in an optional filtering process.

Block 622 may be followed by block 624, "ESTABLISH LINKS BETWEEN NODES." At block 624, links between each node vertex may be set up resulting in edge labels, which represent the connectivity between each node. Thus, an image can be converted into an attributed graph in the image domain with attributes attached to both vertices and edges.

Block 624 may be followed by block 626, "DEFINE ATTRIBUTED GRAPHS IN IMAGE DOMAIN." At block 626, the attributed graphs are defined through the vertex and edge labels. The blocks 622 through 626 may be performed by a dynamic modeling module of a processor of a first computing device (e.g. processor 504 or graphics processing unit 548 of a computing device 500). Blocks 628 through 634 may, on the other hand be performed by a graph matching module of the same processor or another processor on a second computing device coupled to the first computing device through a network. Of course, all blocks may be performed by a single module as well.

Block 626 may be followed by block 628, "ESTIMATE ACTUAL ATTRIBUTE VALUES OF EACH NODE." At block 628, actual attribute values of each node may be estimated in image domain by, for example, time-averaging from a set of fluctuating images with respect to each node. The estimation is part of a pre-process, which may also include a synaptic weight and connection computation for the links.

Block 628 may be followed by block 630, "MATCH ATTRIBUTED GRAPHS." At block 630, the attributed graphs may be matched based on finding and selectively activating nodes in the sub-graphs of the image domain. The one-to-one connection between corresponding points in the sub-graphs of the image domain and model domain may also be determined as part of attributed graph matching. This initial portion of graph matching, also referred to as segmentation in the image domain, may be achieved by binding nodes with similar feature vectors together.

Block 630 may be followed by block 632, "IDENTIFY & ACTIVATE LINKS IN SUB-GRAPH(s)." At block 632, the second portion of attributed graphs may be accomplished by retrieving a connection pattern for the nodes in both domains from an associative memory. As part of identification and activation of the links, the matching of vertex labels and edge labels may be optimized according to an established cost function.

Block 632 may be followed by block 634, "MAP CONNECTIONS." At block 634, the many-to-many connections between nodes with similar features in image domain and model domain sub-graphs may be reduced to one-to-one connections. As a result, the dynamic binding between matched graphs may be used to back label the image with the patterns being recognized. Representations of composite objects and scenes may then be formed based on the patterns by rendering software and/or hardware on the same computing devices or other computing devices.

The blocks included in the above described process are for illustration purposes. Object recognition through dynamic modeling and graph matching may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

FIG. 7 illustrates a block diagram of an example computer program product 700 arranged in accordance with at least some embodiments described herein. In some examples, as shown in FIG. 7, computer program product 700 may include a signal bearing medium 702 that may also include machine readable instructions 704 that, when executed by, for example, a processor, may provide the functionality described above with respect to FIG. 5 and FIG. 6. Thus, for example, referring to processor 504, the AR module 526 may undertake one or more of the tasks shown in FIG. 7 in response to instructions 704 conveyed to processor 504 by medium 702 to perform actions associated with object recognition based on dynamic modeling as described herein. Some of those instructions may include establishing links between nodes; defining attributed graphs; matching attributed graphs between image and model domains and determining mapped connections.

In some implementations, signal bearing medium 702 depicted in FIG. 7 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the processor 504 by an RF signal bearing medium 702, where the signal bearing medium 702 is conveyed by a wireless communications medium 710 (e.g., a wireless communications medium conforming with the IEEE 802.11 standard).

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

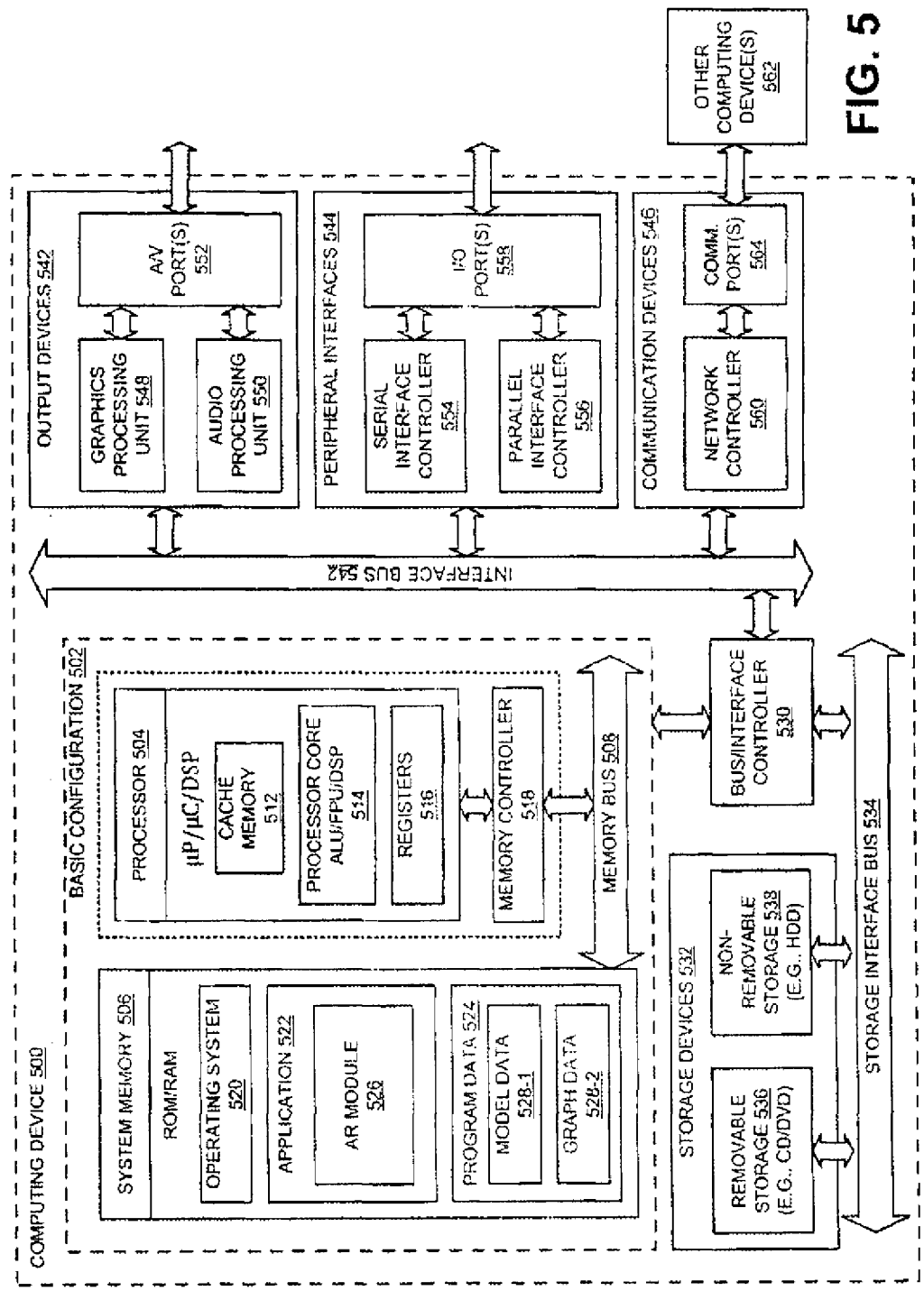

What is claimed is:

1. A method for performing object recognition in Augmented Reality (AR) systems, the method comprising:
   converting a two dimensional image of an object to an image domain representation;
   defining an attributed graph in the image domain based on links between nodes of the image domain representation;
   defining another attributed graph in a model domain, wherein one or more attributed graphs in the model domain act as a prototype graph database;
      selecting a prototype graph from the prototype graph database by creating one or more prototype sets from a training graph set in the model domain, wherein an initial set is constructed by selecting graphs randomly from the training set;
   decomposing the attributed graph in the image and model domains into a combination of subsets from the prototype graph with respect to each domain to simplify a structure of the attributed graph in the image domain and the other attributed graph in the model domain;
   estimating actual attribute values for nodes in the model domain by applying time-averaging to a set of fluctuating images with respect to each node in the model domain; and
   matching the attributed graphs in the image and model domains by identifying and activating links between corresponding nodes of the attributed graphs.

2. The method according to claim 1, further comprising reducing a number connections between the attributed graphs in the image and model domains; and
   back-labeling a model domain representation of the two dimensional image with patterns based on the reduced connections.

3. The method according to claim 2, further comprising rendering a composite image by overlaying the two dimensional image with the model domain representation.

4. The method according to claim 1, further comprising determining features associated with each node in the image domain representation; and
   obtaining vertex labels representing activity vectors of local features for each node in the image domain representation by applying the features to pixels of the two dimensional image.

5. The method according to claim 4, further comprising obtaining edge labels that represent connectivity between the nodes of the image domain representation by establishing links between the nodes of the image domain representation.

6. The method according to claim 5, wherein the attributed graph in the image domain is defined as a collection of the nodes in the image domain representation and associated vertex and edge labels.

7. The method according to claim 1, further comprising encoding bindings between nodes in the model domain as temporal correlations.

8. The method according to claim 7, further comprising computing and assigning weights to links between the nodes in the model domain based on the encoded bindings.

9. An apparatus to perform object recognition in Augmented Reality (AR) systems, the apparatus comprising:
   a memory adapted to store image data and graph data;
   a first processing unit adapted to execute a dynamic modeling module, wherein the dynamic modeling module is adapted to:
      transform a two dimensional (2D) image from the stored image data to an image domain representation comprising a 2 D array of linked nodes with each node encoding at least one distinct feature in image domain, wherein one or more links between the nodes are excitatory connections having a positive weight;
      determine vertex labels representing activity vectors of the at least one feature for each node in the image domain;
      determine edge labels representing connectivity between the nodes of the image domain;
      define an attributed graph in model domain based on one or more of the vertex labels and/or the edge labels, the attributed graph being stored in the memory as part of the graph data, wherein the attributed graph and one or more other attributed graphs defined in the model domain act as a prototype graph database; and
      select a prototype graph from the prototype graph database by creating one or more prototype sets from a training graph set in the model domain to decompose the attributed graph in the model domain into a combination of subsets from the prototype graph with respect to each domain to simplify a structure of the attributed graph in the model domain, wherein an initial set is constructed by selecting graphs randomly from the training set; and
   a second processing unit adapted to execute a graph matching module, wherein the graph matching module is adapted to:
      estimate actual attribute values for nodes in the model domain by applying time-averaging to a set of fluctuating images with respect to each node in the model domain;
      identify and activate the one or more links between the nodes in the image domain and corresponding nodes in the model domain to preserve the at least one distinct feature; and
      reduce a number of connections between nodes with similar features.

10. The apparatus according to claim 9, wherein the dynamic modeling module is further adapted to
group and selectively activate the nodes in the image domain.

11. The apparatus according to claim 10, wherein the dynamic modeling module is further adapted to group the nodes in the image domain by binding nodes in the image domain with similar feature vectors together.

12. The apparatus according to claim 9, wherein the graph matching module is further adapted to identify and activate the links between the nodes in the image domain and in the model domain by
retrieving a connection pattern from the memory; and
performing a search for vertex positions with the connection pattern retrieved from the memory.

13. The apparatus according to claim 12, wherein the graph matching module is further adapted to
match the vertex labels and the edge labels according to a predefined cost function.

14. The apparatus according to claim 9, further comprising a third processing unit adapted to execute a rendering module, wherein the rendering module is adapted to render a composite image by overlaying the two dimensional image with an model domain representation of the image based on the reduced connections.

15. The apparatus according to claim 14, wherein the first, second, and third processing units are integrated into a first computing device, a second computing device, and a third computing device, respectively, and wherein the first, the second, and the third computing devices are communicative over a network.

16. The apparatus according to claim 14, wherein the first, second, and third processing units are part of the same processor.

17. A method for performing object recognition in Augmented Reality (AR) systems, the method comprising:
converting a two dimensional image of an object to an image domain representation comprising a plurality of linked nodes, each node including a set of feature detectors bundled to act as a composite feature detector;
determining vertex labels that represent activity vectors of the feature detectors by applying the feature detectors to each pixel of the two dimensional image;
determining edge labels that represent connectivity between the nodes by detecting links between each node;
generating an attributed graph in the image domain based on the vertex and edge labels;
providing the composite feature detector to a model domain;
defining an attributed graph in the model domain, wherein the attributed graph in the model domain is an idealized copy of the attributed graph in the image domain established from the provided composite feature detector, and wherein one or more attributed graphs in the model domain act as a prototype graph database with which graph matching is implemented;
selecting a prototype graph from the prototype graph database by:
creating one or more prototype sets from a training graph set in the model domain, wherein an initial set is constructed by selecting graphs randomly from the training set, and wherein the initial set includes graph models in the image domain and the model domain;
scanning the training graph set in the model domain to find the prototype graph corresponding to the initial set; and
outputting the prototype graph;
decomposing the attributed graphs in the image domain and the model domain into a combination of subsets from the prototype graph with respect to each domain to simplify a structure of the attributed graphs in the image domain and the model domain;
determining connections between the attributed graphs in the image domain and the model domain based on matching vertex labels and edge labels of the attributed graphs; and
reducing the connections to a topology-preserving mapping between the image domain and the model domain.

18. The method according to claim 17, comprising:
recognizing patterns based on the mapped connections;
generating a virtual image based on the recognized patterns; and
generating a composite image based on overlaying the two dimensional image and the virtual image.

19. The method according to claim 17, further comprising:
determining the connections between the attributed graphs in the image domain and the model domain by searching for vertex positions and optimizing a match between vertex labels and edge labels for each vertex position according to a predefined cost function.

20. The method according to claim 17, further comprising:
binding nodes in the image domain with similar feature vectors without reference to the model domain.

21. The method according to claim 17, further comprising:
determining connections for an attributed graph pair in the image domain and the model domain, respectively, if an approximate neighborhood preserving and feature type preserving mapping exists between substantially all nodes of the attributed graphs.

22. The method according to claim 17, further comprising:
determining connections for an attributed graph pair in the image domain and the model domain, respectively, based on assigned weights to links between nodes in the image domain.

23. The method according to claim 17, wherein generating the attributed graph in the image domain, defining the attributed graph in the model domain, and determining connections between the attributed graphs in the image domain and the model domain are performed in an interlaced fashion.

24. The method according to claim 17, wherein each node is associated with one or more features including: a local light intensity, a reflectance property, an object pose, an occlusion, and/or a background variation.

25. A system to perform object recognition in Augmented Reality (AR) systems, comprising:
at least one sensor adapted to capture a two dimensional (2D) image of a real scene;
an image processing server adapted to convert the 2 D image to an image domain representation comprising a 2 D array of linked nodes in the image domain, each node including a set of feature detectors, wherein one or more links between the nodes are excitatory connections having a positive weight;
a reality server adapted to:
determine vertex labels representing activity vectors of the at least one feature for each node in the image domain;
determine edge labels representing connectivity between the nodes of the image domain;

define an attributed graph in the image domain and another attributed graph in model domain based on the vertex and edge labels, wherein one or more attributed graphs in the model domain act as a prototype graph database;

select a prototype graph from the prototype graph database by creating one or more prototype sets from a training graph set in the model domain, wherein an initial set is constructed by selecting graphs randomly from the training set;

decompose the attributed graph in the image domain and the other attributed graph in the model domain into a combination of subsets from the prototype graph with respect to each domain to simplify a structure of the attributed graph in the image domain and the other attributed graph in the model domain;

estimate actual attribute values for nodes in the model domain by applying time-averaging to a set of fluctuating images with respect to each node in the model domain;

identify and activate links between the nodes in the image domain and corresponding nodes in the model domain;

reduce a number of connections between nodes with similar features; and an image generation server adapted to generate an augmented scene by overlaying the 2 D image and a virtual image rendered based on the reduced connections between the attributed graph in the image domain and the other attributed graph in the image domain, wherein the augmented scene generation is performed through luminance keying.

26. The system according to claim 25, wherein the reality server is further adapted to
store the attributed graph in the model domain in an associative data store.

27. The system according to claim 25, wherein the reality server is further adapted to
identify and activate links between the nodes in the image domain and corresponding nodes in the model domain by determining an approximate neighborhood preserving and feature type preserving mapping between substantially all nodes of the attributed graphs; and
reduce the connections to topology preserving connections.

28. The system according to claim 25, wherein the image processing server, reality server, and image generation server are part of one of: a centralized AR system and a distributed AR system.

29. The system according to claim 25, further comprising a visualization system adapted to visualize the augmented scene, wherein the visualization system includes one or more of a head-mounted display, a virtual retinal display, and/or a monitor.

* * * * *

UNITED STATES PATENT AND TRADEMARK OFFICE
CERTIFICATE OF CORRECTION

Page 1 of 2

PATENT NO. : 8,866,845 B2
APPLICATION NO. : 12/720858
DATED : October 21, 2014
INVENTOR(S) : Leung et al.

It is certified that error appears in the above-identified patent and that said Letters Patent is hereby corrected as shown below:

In the Drawings

Delete drawing sheet 7, and replace drawing sheet. (Attached)

In the Specification

In Column 12, Line 63, delete "and or" and insert -- and/or --, therefor.

In the Claims

In Column 17, Line 12, in Claim 12, delete "by" and insert -- by: --, therefor.

In Column 19, Line 18, Claim 25, delete "applying" and insert -- applying; --, therefor.

Signed and Sealed this
Fourteenth Day of April, 2015

Michelle K. Lee
*Director of the United States Patent and Trademark Office*